Feb. 2, 1937.  A. HOLLANDER  2,069,367
RUBBER BEARING
Filed Dec. 11, 1935   2 Sheets-Sheet 1
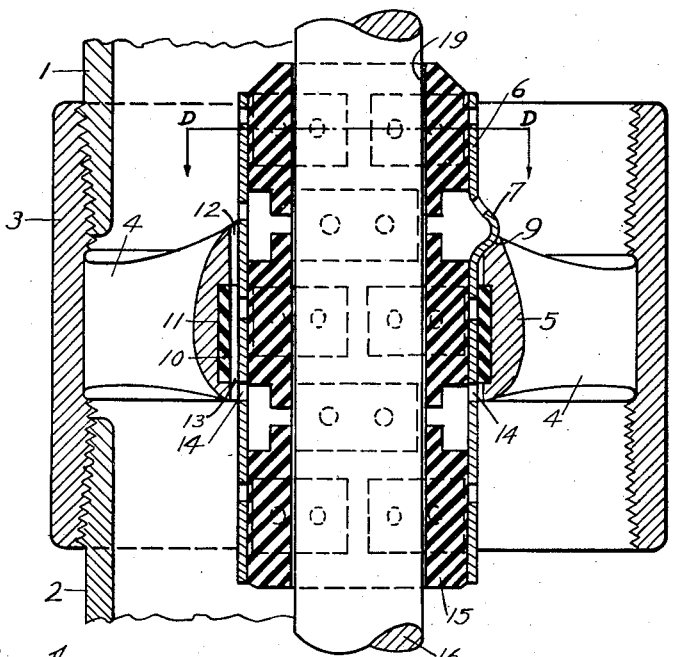
Fig 1
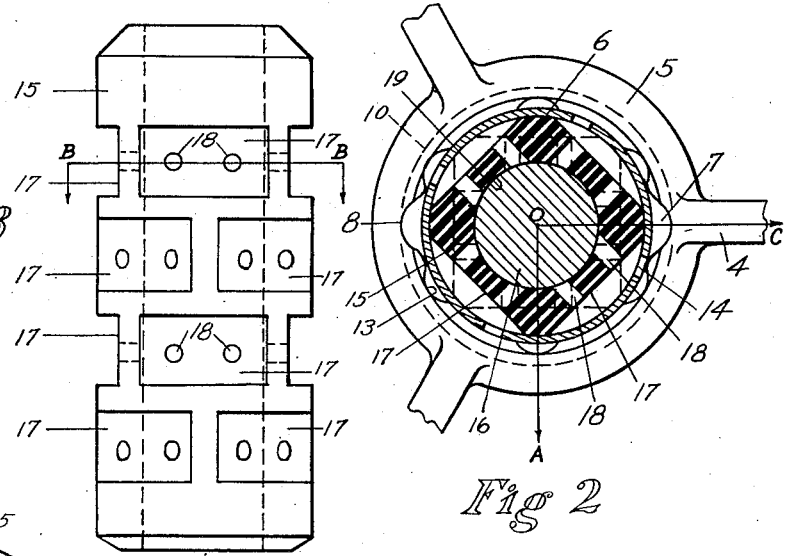
Fig 3
Fig 2
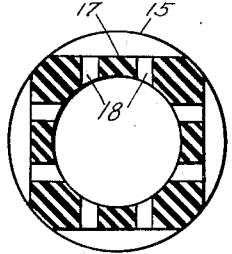
Fig 4
Aladar Hollander
INVENTOR.
BY John D. Chesnut
ATTORNEYS.

Feb. 2, 1937. A. HOLLANDER 2,069,367
RUBBER BEARING
Filed Dec. 11, 1935   2 Sheets-Sheet 2
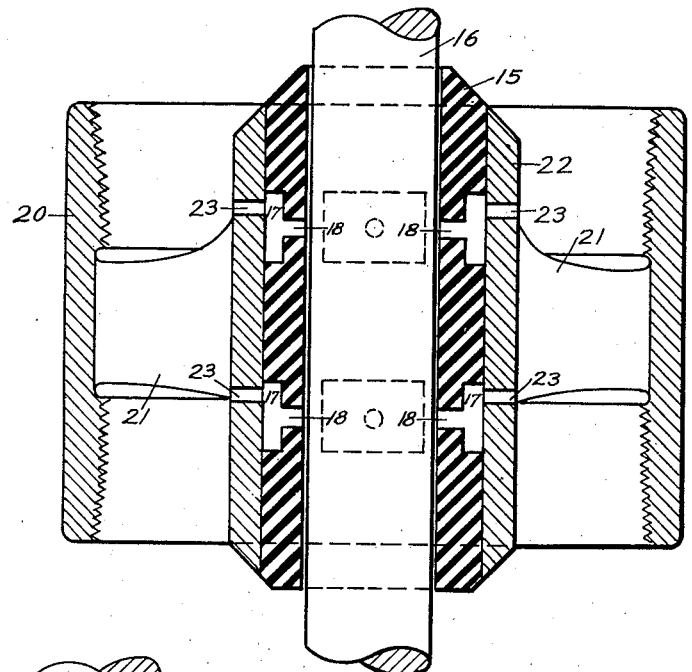
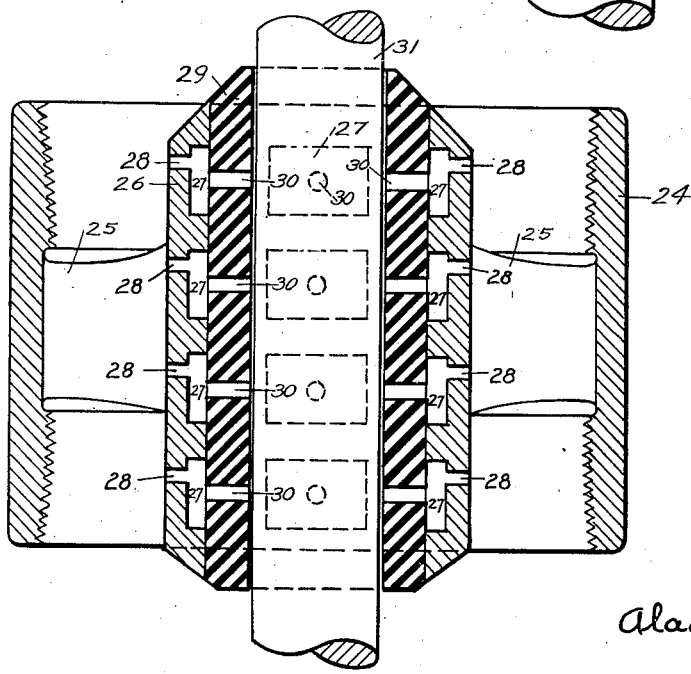
Aladar Hollander
INVENTOR.
BY John D. Chesnut
ATTORNEYS.

Patented Feb. 2, 1937

2,069,367

UNITED STATES PATENT OFFICE 2,069,367

RUBBER BEARING

Aladar Hollander, Berkeley, Calif., assignor to Byron Jackson Co., Huntington Park, Calif., a corporation of Delaware Application December 11, 1935, Serial No. 53,895

10 Claims. (Cl. 308—121)

This invention relates to soft rubber bearings of the water lubricated type. More particularly the invention relates to improvements in the design of such bearings for use in deep well centrifugal pumps.

It has heretofore been common practice to provide the shaft of a deep well centrifugal pump with bearings made of soft rubber adapted to be lubricated by the water passing up through the pump column when the pump is in operation. Such bearings are usually made in the form of rubber cylinders or sleeves adapted to encase the pump shaft. In some instances the bearings rotate with the pump shaft while in other instances the bearings are stationary. The bearings are held in place by means of a suitable spider and are sometimes provided with a series of perforations or grooves to permit water to flow through the bearing and lubricate it. The trouble with the bearings in use heretofore has been the destruction of the bearings when starting the pump owing to the failure of the operator to thoroughly lubricate or prime the bearings with water before starting the pump. This trouble is particularly apt to be encountered in very deep wells where it takes the water from the pump at the bottom of the well an appreciable time to reach and lubricate the bearings.

It is the object of the present invention to provide a bearing construction which is self-priming and which will insure that the bearings will be properly lubricated at all times, even when the pump is started and before the water from the pump has reached the bearings.

Other objects and advantages will be apparent from the following specification and drawings wherein:

Figure 1 is a fragmentary cross-sectional elevation taken through one of the bearings and spider in the column of a deep well pump, on the lines A, O, C of Figure 2.

Figure 2 is a cross section taken on line D—D of Figure 1.

Figure 3 is an elevation of a rubber bearing such as is shown in Figure 1.

Figure 4 is a cross section taken on line B—B of Figure 3.

Figure 5 is a fragmentary cross-sectional elevation taken through a bearing supported in a spider-coupling of a modified design.

Figure 6 is a fragmentary cross-sectional elevation taken through a modified bearing supported in still another form of spider-coupling.

Referring to Figure 1, two sections of well column are indicated at 1 and 2 joined together by a special spider-coupling 3. The coupling 3 is provided with webs 4 supporting a central annular hub portion 5 adapted to receive a cylindrical sleeve 6. The sleeve 6 is preferably made of brass or other rust-resisting metal and is provided with a series of perforations 14. The sleeve 6 is provided with suitable means for preventing relative rotation between the sleeve and hub 5, which, in the present instance is a pair of outwardly extending nubs 7 and 8 adapted to be received in coresponding recesses 9 formed in the upper surface of hub 5. The sleeve 6 is centered in and spaced from the hub 5 by means of a resilient ring 10 preferably made of relatively soft rubber. The ring 10 is received in an annular recess 11 formed in the inner face of hub 5. Ring 10 is of greater thickness than the depth of recess 11 so that the sleeve 6 is spaced from hub 5 as shown at 12. The ring 10 is provided with series of grooves 13 formed axially in the inner face thereof. By making the ring 10 of resilient material, such as rubber, a flexible mounting is provided for the bearing, thus greatly increasing the life of the bearing in service.

The soft rubber bearing is indicated at 15 and consists of a tubular sleeve adapted to fit tightly and non-rotatably within the metal sleeve 6. The pump shaft 16 makes a close running fit with the bore 19 of the bearing 15. A series of flats 17 are formed in the outer surface of the rubber bearing 15. The flats 17 are provided with perforations 18 extending through to the bore of the bearing. When the bearing is pressed into the perforated metal sleeve 6 the flats 17 co-operate with the walls of sleeve 6 to provide pockets or reservoirs for water. To this end the perforations 14 in sleeve 6 are so spaced as to be near the top of the pockets. The pockets communicate with the inner surface of the bearing through the perforations 18 to permit water to pass from the pockets to the bearing surface for lubrication. Because the shaft 16 makes a close fit with the bearing, which close fit might prevent the entrance of water into the pockets 17, the sleeve 6 is spaced from the spider hub 5 as shown at 12 (by means of the grooved ring 10) so that water can flow through the space 12 and grooves 13, through the perforations 14 in sleeve 6 and into the pockets 17.

When the pump is in operation water enters the pockets 17 in the manner described above and lubricates the surface of the bearing 15. When the pump is stopped, the pockets or reservoirs 17 serve to hold a supply of water until the pump is started again. Because the bearings 15 are located in the column of the well, very little evaporation takes place and the reservoirs will hold water for a very long time. When the pump is started, the normal vibration of the shaft 16 is sufficient to cause the soft rubber bearing to yield sufficiently to force water out through the perforations 18 to the surface of the bearing. Thus it is not necessary to prime the bearings by pouring water down the well before starting the pump, as is necessary with bearings of the type used heretofore. The danger of damaging or destroying the bearings when starting the pump is therefore eliminated.

Figure 5 shows a modified form of coupling 20 provided with webs 21 supporting a tubular hub 22. The hub 22 is provided with a series of perforations 23, preferably arranged in radial rows, the rows being spaced apart along the vertical axis of the hub a distance such that the perforations will register with the upper portion of the pockets 17 in the rubber bearing 15. The bearing 15 is pressed tightly into the hub 22 and makes a snug rotating fit with the pump shaft 16.

The term "soft rubber" as used herein means rubber of the hardness in general use for water lubricated rubber bearings other than so-called "hard rubber" bearings. Soft rubber bearings are noted for resistance to abrasion whereas hard rubber bearings are not. Good commercial soft rubber bearings have a hardness of about 65 to 70 with a Scott tester although the hardness may vary through a considerable range and still be known as "soft".

Although the rubber used in water lubricated bearings is "soft" in the sense that it withstands abrasion, it provides a bearing which is relatively rigid with respect to distortion due to shaft vibration. Thus, it is necessary, (in order to permit the necessary movement of the rubber walls which squeezes the water out of the pockets) to reduce the rubber wall thickness to such a degree that the walls will flex readily when under radial stress. This is accomplished in the bearings shown in the drawings by forming the pockets in the bearing rather than in the spider or supporting member. The pockets themselves reduce the wall thickness to such an extent that the bearing flexes readily while providing a sufficient bearing support for the shaft. This result is most easily accomplished by forming the bearings as shown, in the shape of cylinders provided with pockets in the outer surface of the cylinder formed by the flats 17, the flats being separated from each other, longitudinally, by walls or flanges having circular outer faces conforming to the outer surface of the cylinder. Although the bearing shown in Figs. 1 to 5 is provided with four flats in each radial plane, the bearing could be made with any number of flats, each forming a separate pocket, or with an annular circumferential groove forming a single pocket. The series of flats is preferred to the circumferential groove because the pockets so formed confine the water against any appreciable lateral flow, thus causing the water to be more readily squeezed out when the bearing is distorted by radial pressure.

The pockets 17 shown in the bearings 15 of Figures 1 to 5, inclusive, are formed in the rubber bearing. While this is the preferred design, because it provides a very flexible pocket having three of its four walls formed of rubber, it is possible to form the pocket in the supporting sleeve or hub as shown in Figure 6. In this case the coupling 24 is provided with webs 25 supporting a hub 26. The hub 26 is provided with a series of recesses or pockets 27. The hub 27 is provided with openings 28 communicating the upper portion of each pocket 27 with the exterior of the hub to permit the entrance of water into the pocket. The rubber bearing 29 is a tubular sleeve fitting tightly into the hub 26 and is provided with series of holes 30 extending through the walls of the bearing and adapted to communicate the upper portion of each pocket 27 with the surface of the pump shaft 3.

It is to be understood that the bearings described above are merely preferred embodiments of the present invention which is not to be considered as limited to the exact details of the devices as described but may be varied within limits, as defined by the claims.

I claim:

1. A bearing structure for vertical water-lubricated pump shaft bearings comprising a soft rubber sleeve bearing adapted to surround a rotating shaft, a rigid casing supporting said rubber sleeve bearing, pockets formed between the contacting faces of said sleeve and casing adapted to receive and retain a portion of the water being pumped, said pockets being provided intermediate their ends with fluid discharge passages communicating with the face of the bearing and fluid inlets through said casing communicating with said pockets above the level of said discharge passage.

2. A bearing structure for vertical, water-lubricated pump shaft bearings comprising a soft rubber sleeve bearing adapted to surround a rotating shaft, a rigid casing tightly enclosing and supporting said rubber bearing, pockets formed between the contacting faces of said casing and bearing adapted to receive and retain a portion of the water being pumped, said pockets being provided intermediate their ends with fluid discharge ports communicating with the face of the bearing, at least one wall of said pockets being formed by the rubber sleeve and fluid inlets through said casing communicating with said pockets above the level of said discharge ports.

3. A bearing structure for vertical, water-lubricated pump shaft bearings comprising a spider for supporting the bearing in a well column, said spider being provided with a hub having a central, circular, axial opening adapted to receive and support a rubber bearing, a rubber bearing comprising a soft rubber cylinder adapted to fit tightly into the opening in said spider hub, said rubber cylinder being provided with several series of radially disposed flats formed in the outer cylindrical surface thereof, each radial series of flats being separated longitudinally from the adjacent radial series of flats by a wall formed by the intervening body portion of the rubber cylinder, fluid ports communicating the middle portion of said flats with the bearing surface, and fluid ports for admitting well fluid to the upper end of the pockets formed by the walls of said flats and the spider hub.

4. A rubber bearing of the water lubricated type for use on a vertical shaft and comprising a soft rubber sleeve having recesses formed in the outer surface thereof, passages communicating the middle portion of said recesses with the bore of said rubber sleeve, a rigid sleeve tightly encasing said rubber sleeve and fluid passages communicating the upper portion of said recesses with the exterior of said rigid sleeve.

5. A rubber bearing of the water lubricated type for use with a vertical shaft, comprising a soft rubber sleeve having recesses formed in the outer surface thereof, fluid passages communicating the middle portion of said recesses with the bore of said sleeve, a rigid sleeve tightly encasing said rubber sleeve, and fluid passages through said rigid sleeve communicating the upper portion of said recesses with the exterior of said rigid sleeve.

6. A rubber bearing of the water lubricated type for use on a vertical shaft, comprising a soft rubber sleeve provided with pockets for receiving and retaining water, fluid passages communicating the middle portion of said pockets with the bore of said sleeve and fluid passages communicating the upper portion of said pockets with the exterior of said sleeve.

7. A rubber bearing of the water lubricated type for use on the shaft of a deep well pump, comprising a soft rubber sleeve provided with pockets for receiving and retaining water, fluid passages communicating the middle portion of said pockets with the bore of said sleeve, fluid passages communicating the upper portion of said pockets with the exterior of said sleeve, and a spider for supporting said bearing in a well column.

8. A rubber bearing of the water lubricated type for use on the shaft of a deep well pump, comprising a soft rubber sleeve having recesses formed in the outer surface thereof, a rigid sleeve tightly encasing said rubber sleeve, fluid passages communicating the middle portion of said recesses with the bore of said rubber sleeve, fluid passages communicating the upper portion of said pockets with the exterior of said rigid sleeve, a spider for supporting said rigid sleeve in a well column and spacing means between said rigid sleeve and said spider providing channels giving the well water access to the fluid passages in said rigid sleeve.

9. A rubber bearing of the water lubricated type for use on the shaft of a deep well pump, comprising a soft rubber sleeve provided with pockets adapted to receive and hold water, a rigid sleeve tightly encasing said bearing, fluid passages communicating the middle portion of said pockets with the bore of the bearing, fluid passages communicating the upper portion of said pockets with the exterior of said rigid sleeve, and a spider for supporting said bearing in a well column, there being resilient means interposed between said rigid sleeve and said spider to provide said bearing with a resilient mounting.

10. A rubber bearing of the water lubricated type for use on the shaft of a deep well pump, comprising a soft rubber sleeve provided with pockets adapted to receive and retain water, a rigid sleeve tightly encasing said rubber sleeve, fluid passages communicating the middle portion of said pockets with the bore of said rubber sleeve, fluid passages communicating the upper portion of said pockets with the exterior of said rigid sleeve, a spider for supporting said bearing in a well column, and a resilient rubber ring interposed between said rigid sleeve and said spider providing a resilient mounting for said bearing.

ALADAR HOLLANDER.